United States Patent [19]

Ulug

[11] 4,439,856
[45] Mar. 27, 1984

[54] BIMODAL BUS ACCESSING SYSTEM

[75] Inventor: Mehmet E. Ulug, Schenectady, N.Y.

[73] Assignee: General Electric Company, Schenectady, N.Y.

[21] Appl. No.: 351,820

[22] Filed: Feb. 24, 1982

[51] Int. Cl.³ .............................................. H04J 6/00
[52] U.S. Cl. ...................................... 370/85; 370/94; 340/825.5
[58] Field of Search ...................... 370/85, 89, 94, 92, 370/95, 79; 340/825.5, 825.51

[56] References Cited

U.S. PATENT DOCUMENTS

| | | | |
|---|---|---|---|
| 3,851,104 | 11/1974 | Willard et al. | 179/15 |
| 4,063,220 | 12/1977 | Metcalfe et al. | 340/147 |
| 4,210,780 | 7/1980 | Hopkins et al. | 370/80 |
| 4,293,948 | 10/1981 | Soderblom | 370/89 |
| 4,387,425 | 6/1983 | El-Gohary | 370/85 |

FOREIGN PATENT DOCUMENTS 60067 9/1982 European Pat. Off. .............. 370/85

OTHER PUBLICATIONS

Fouad A. Tobagi, "Multiaccess Protocols in Packet Communication Systems," *IEEE Transactions on Communications*, vol. Com-28, No. 4, Apr. 1980, pp. 468-485.

*Primary Examiner*—Douglas W. Olms
*Attorney, Agent, or Firm*—Paul J. Checkovich; James C. Davis, Jr.; Marvin Snyder

[57] ABSTRACT

A bus communication system has each of a plurality of bus interface units (BIUs) connected to a transmission bus at respective spaced locations along the bus. Each BIU includes a transmission system operable in both a contention mode and a token-passing mode. In the contention mode, the transmission system completes the transmission of information packets only after the BIU senses the bus and determines that no additional information packets are being transmitted on the bus. During the token-passing mode, the transmission system transmits an information packet only after the expiration of a time interval unique to that BIU and determined by the relative location both of that BIU and of the last BIU to transmit either an information or a start-up packet on the bus. A control system causes the transmission means to switch between the contention and token-passing modes of operation as a function of the transmission activity on the bus.

15 Claims, 3 Drawing Figures

BIMODAL BUS ACCESSING SYSTEM

BACKGROUND OF THE INVENTION

The present invention is directed towards a bimodal bus accessing system in which a plurality of user terminals communicate with each other via plurality of bus interface units (BIUs) which are connected to a serial straight-line topology bus which may be folded upon itself to provide a ring, star or branching tree bus topology.

In accordance with known bus communication systems, each BIU is associated with at least one user terminal and periodically places information from its associated user terminal on the transmission bus for transmission to the remaining BIUs. The BIU formats this information into one or more information packets which generally include a source address (the address of the BIU associated with the user terminal), a destination address (the address of the user terminal for which the information is intended and its associated BIU), the information to be transmitted and various other information such as parity or CRC bits, etc. Once the BIU has properly formatted the information, it places it on the bus for transmission to the remaining BIUs at times determined by the particular bus accessing scheme being used. One such bus accessing scheme is known as a time division multiple accessing scheme wherein each user terminal is assigned a specific time slot during which it can gain access to the transmission bus. Exemplary of such systems is U.S. Pat. No. 3,851,104. While this system provides a relatively simple bus accessing scheme which prevents collision of two or more information packets on the transmission bus, it has two major drawbacks. Initially, in order for the system to operate properly, each BIU must employ an extremely accurate timer to ensure that the time slots of the individual BIUs do not overlap. Additionally, any given BIU may have to wait a relatively long period of time for its time slot to reappear with the result that information is transmitted relatively, rather than in real-time manner.

In order to overcome the foregoing drawbacks, contention systems using a listen-while-talk protocol have been developed. In accordance with this system, each BIU continually monitors the condition of the transmission bus and places its information packet on the bus whenever the bus is silent. If, during the transmission, the BIU detects other information on the bus, it halts its transmission for a variable time period and then attempts to regain access to a bus when the line is silent. Exemplary of such systems are U.S. Pat. Nos. 4,210,780 and 4,063,220.

While contention systems avoid the need for highly accurate clocks, and also utilize the bus in a more efficient manner during periods in which relatively little information is being transmitted, they exhibit a major drawback in that collisions occasionally occur between transmitted packets. As a result, these systems must retransmit information after a random interval of time whenever a collision occurs. This significantly reduces the efficiency of the system during periods of high bus use.

In order to overcome the foregoing problems, the inventor of the present invention developed a bidirectional token flow system which is described in detail in copending application Ser. No. 351,821, filed Feb. 24, 1982, assigned to the assignee of the present invention and incorporated herein by reference in its entirety. In this system, the right to transmit a packet of information on the transmission bus is transferred from BIU to BIU by the passing of a virtual token. In accordance with this system, no two BIUs receive a token at the same time. As such, only one BIU will have the right to place its information packet on the bus at a given instant. This process avoids the collision of data on the bus and provides a fast and efficient method of transmitting data between the various user terminals. This method is significantly faster than the time division multiple access system of the prior art during periods of low bus usage since there are no unusual time slots. It is more efficient than the contention system during periods of high bus usage since it avoids both the loss of information on the bus to packet collisions and the loss of time due to the various back-off algorithms used. This system is, however, less efficient than a contention system during periods of low bus usage as far as bus access times are concerned.

BRIEF DESCRIPTION OF THE INVENTION

In order to provide the advantageous features of both the contention and bidirectional token flow systems, the present invention combines the two systems in a single bus interface unit and transfers control over the bus accessing method between the contention mode and the token passing mode in a manner which tends to maximize the efficiencies of both systems. In the preferred embodiment, the bus interface unit operates in the contention mode during periods of relatively low bus activity and operates in the token passing mode during periods of high bus usage. To this end, bus accessing is transferred from the contention mode to a token passing mode whenever there is a collision of at least two information packets on the bus. The system remains in the token passing mode as long as the bus activity remains high. If an information packet is not placed on the bus for a predetermined period of time (e.g., 10 seconds), the BIU switches back to the contention mode of operation.

BRIEF DESCRIPTION OF THE DRAWINGS

For the purpose of illustrating the invention, there is shown in the drawings an embodiment which is presently preferred, it being understood, however, that the invention is not limited to the precise arrangements and instrumentalities shown.

DETAILED DESCRIPTION OF THE DRAWINGS

Figure 1:
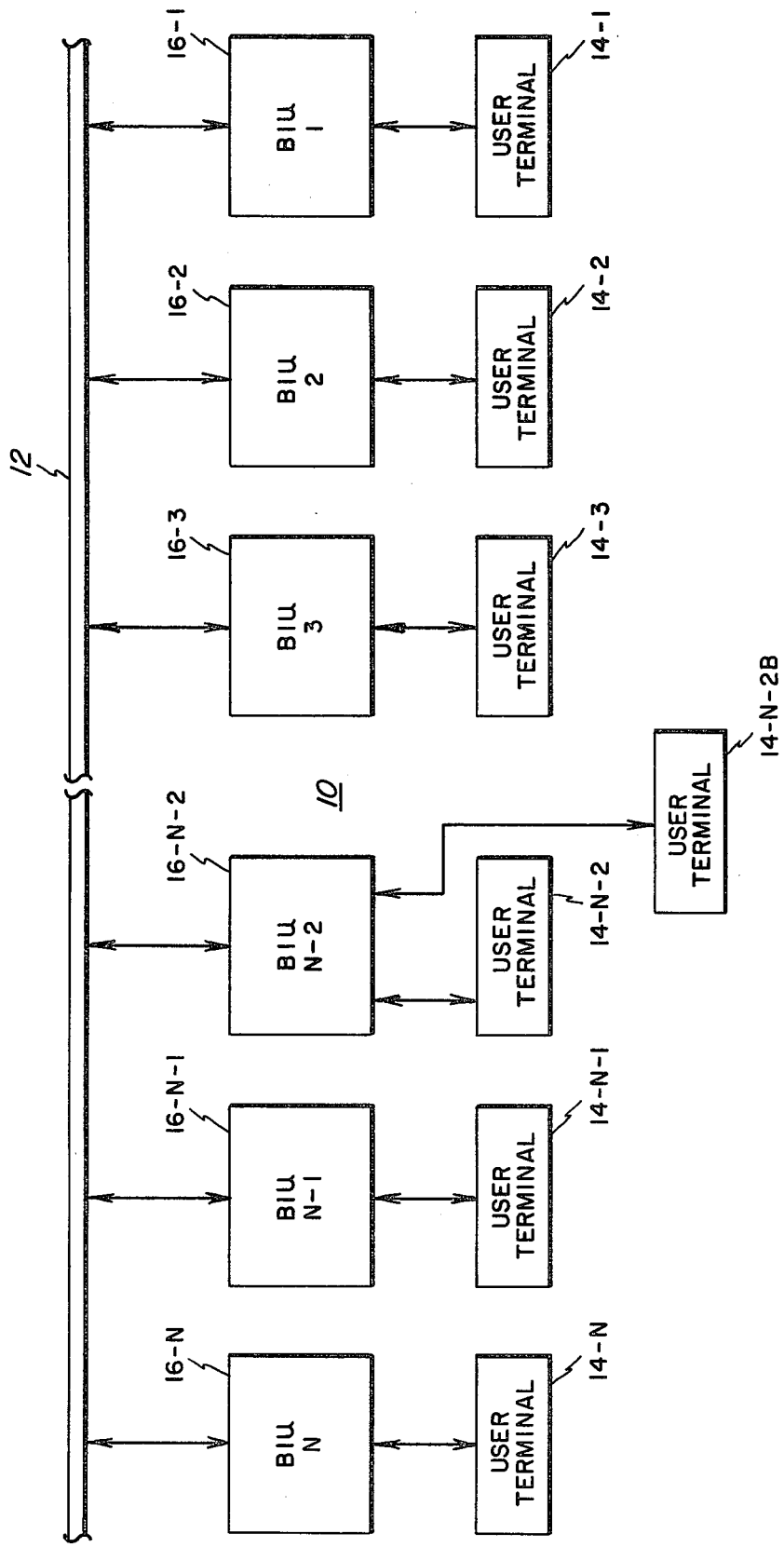
FIG. 1 is a block diagram of a bus communication system which uses the bus accessing scheme of the present invention.

Referring now the drawings, wherein like numerals indicate like elements, there is shown in FIG. 1 a bus communication system 10 in which the bus accessing scheme of the present invention may be used. Bus communication system 10 includes a transmission line 12 which is connected to a plurality of user terminals 14 via a plurality N of bus interface units (BIUs) 16. The purpose of the bus communication system 10 is to permit each of the user terminals to transmit data (in the form of information packets) to the remaining user terminals via the transmission line 12.

User terminals 14 may be computers, terminals or other devices capable of generating and/or accepting digital information. The transmission bus may take the form of any suitable transmission network such as a CATV, coaxial or fiber optic cables, and the like. In the system illustrated in FIG. 1, it is assumed that the transmission bus is a bidirectional bus. Other systems, such as those using fiber optic cables, are unidirectional and therefore require two transmission buses, one for each direction. One such system is illustrated in U.S. Pat. No. 4,210,780 and may be used in connection with the present invention.

The manner in which user terminal information is transmitted between the user terminals 14 and their respective BIU 16, and the method for properly formatting the information packets as they are transferred between the user terminals 14 and the BIUs 16, are well known in the art and do not form part of the present invention. Accordingly, the specific methods and apparatus for carrying out these transfers will not be described herein. Exemplary methods for creating these results may be found in U.S. Pat. Nos. 4,067,220 and 4,210,780. The present invention concerns the bus accessing scheme under which the information packets, once properly formatted, are transferred from the BIUs 16 to the transmission bus 12 and the manner in which the packets on transmission bus 12 are transferred to the individual BIUs will later transfer to the user terminal. Accordingly, it will be assumed that information is periodically transferred from the user terminal 14 to its associated BIU 16 and is formatted for transmission by the BIU.

The bus accessing scheme of the present invention employs both a contention, listen-while-talk protocol (such as that disclosed in U.S. Pat. No. 4,063,220, whose entire disclosure is incorporated herein by reference) and a bidirectional token flow system such as that disclosed in co-pending application Serial No. 351,821 filed on even date herewith and which entire application is incorporated herein by reference.

In accordance with the contention listen-while-talk protocol (e.g. as described in U.S. Pat. No. 4,063,220) each BIU monitors the transmission bus to detect activity (i.e., to sense whether the bus is currently busy). If the bus 12 is busy (i.e., if an information packet is presently being transmitted on the bus), the BIU 16 defers transmission of additional information packets until the current user of the bus 12 is finished transmitting and the bus 12 is no longer busy. If any BIU 16 determines that the bus 12 is not presently busy, that BIU may attempt to transmit on the bus.

As a BIU 16 transmits its information packet, it also monitors the transmission bus 12. If the BIU 16 does not detect any errors in its own transmission for the duration of the end-to-end propagation delay along the bus 12, it determines that it has gained sole access to the bus 12 and may successfully complete the transmission of its information packet. Upon detection of a collision within the propagation delay interval, each of the colliding BIUs 16 aborts its own transmission and subsequently retransmits its information packet after a random delay.

In accordance with the bidirectional token flow system of copending application Ser. No. 351,821, the right to transmit a packet of information on transmission bus 12 is transferred from BIU 16 to BIU 16 by the passing of a virtual token. No two BIUs 16 will receive the token at the same time with the result that only one BIU will have the right to place its information packet on the bus 12 at any given instant.

In accordance with this system, the two endmost BIUs 16-1, 16-N alternately initiate right and left token passing sweeps, respectively, by placing either an information packet (which includes both header information necessary for a bus accessing scheme protocol and an information section providing the information to be transmitted from one user terminal 14 to another user terminal 14) or a start-up packet (containing the same header information but having no information section on bus 12). In response to each sweep initiating packet, each BIU 16 calculates a token time interval which is unique to that BIU and which is determined by the difference between the location of the BIU 16 making the calculation and the BIU 16 transmitting the sweep initiating packet. Any BIU 16 which does not detect the presence of an additional information packet on the transmission bus before the expiration of its token time interval is considered to have received a virtual token and obtains the right to transmit any qualified information packet it has received from its user terminal 14. If, before the end of its calculated token time interval, the BIU 16 receives an information packet generated by an upstream BIU 16 (a BIU to its right during a right sweep and a BIU to its left during a left sweep), the BIU 16 recalculates the token time interval as a function of the difference between its location on the bus 12 and the location of the transmitting BIU 16. This process continues at each BIU 16 until its most recently calculated token time interval times out at which time the BIU 16 is free to transmit an information packet.

Figure 2:
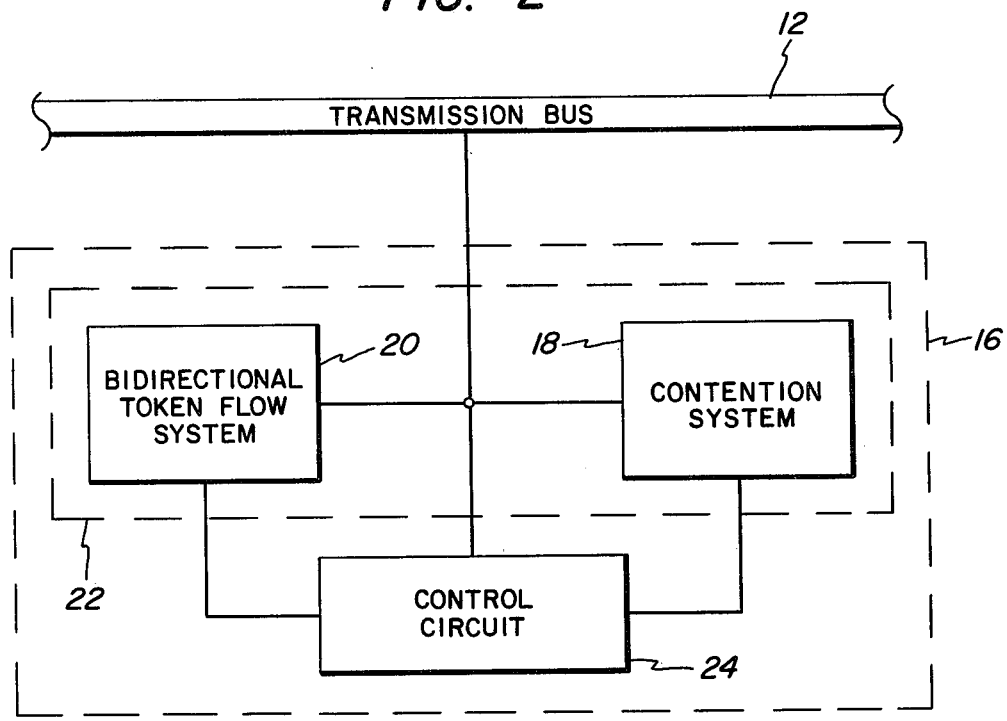
FIG. 2 is a block diagram of the bus interface unit of the bus communication system of FIG. 1.

A BIU 16 which alternatively utilizes the contention or the bidirectional token flow systems to determine when the BIU 16 can transmit information on bus 12 is illustrated schematically in FIG. 2. In this figure, the contention and token flow systems are illustrated by separate blocks 18, 20 since both systems may be implemented separately. For example, the contention system 18 can take the form illustrated in U.S. Pat. No. 4,063,220. Similarly, the bidirectional token flow system can take the form illustrated in copending application Ser. No. 351,821. If desired, both systems may share a substantial amount of hardware and, if the systems are implemented using microprocessors, a substantial amount of software. Since the particular structure of these systems is shown in the foregoing patent documents, and since the specific structure of these systems does not form part of the present invention, no further disclosure of these systems will be contained herein. If additional information is desired, reference should be had to the foregoing patent documents. Whatever specific implementation is used, the two systems cooperate to form a transmission system 22 which alternatively operates in a contention mode or in a token flow mode under the control of a control circuit 24. In the following description, it will be assumed that contention and token flow systems 18 and 20 are implemented separately. It should be recognized, however, that the present invention is not limited to such implementation.

Control circuit 24 monitors the activity on transmission bus 12 and transfers transmission system 22 between the contention and token flow modes of operation by selectively activating and deactivating bidirectional token flow system 20 and contention system 18. In the preferred embodiment, control circuit 24 enables contentions system 18 (and disables bidirectional token flow system 20) during periods of relatively low activity on transmission bus 12. Whenever the activity on transmission bus 12 becomes sufficiently high to cause a collision of information packets on bus 12, control circuit 24 enables bidirectional token flow system 20 and disables contention system 18 so as to cause transmission circuit 22 to operate in the token flow mode. Bidirectional token flow system 20 will maintain control over the manner in which information packets are placed on transmission bus 12 as long as at least one information packet is placed on transmission bus 12 every predetermined time period (e.g. 10 seconds). If no information packet is placed on transmission bus 12 during this time period, control circuit 24 will re-enable contention system 18 and return transmission system 22 to the contention mode of operation.

Figure 3:
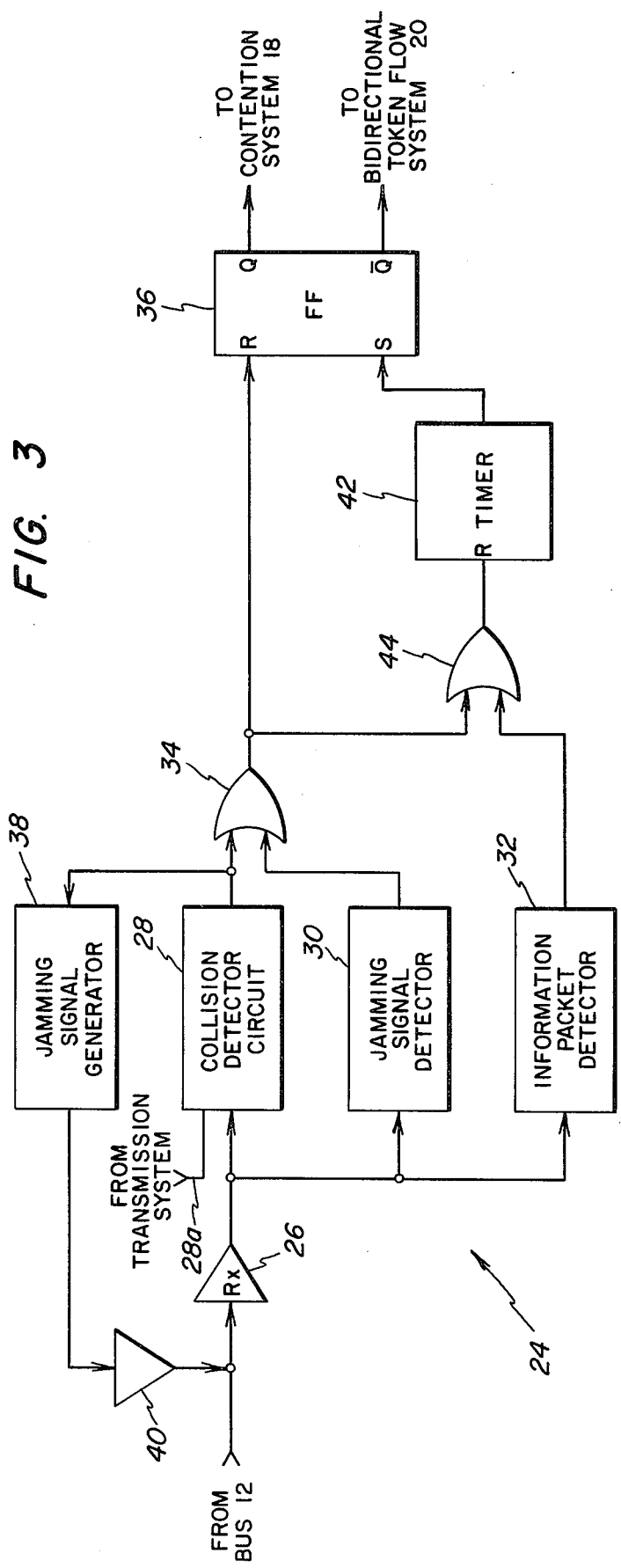
FIG. 3 is a block diagram of the control circuit forming part of the bus interface unit of FIG. 2.

One possible construction of control circuit 24 is illustrated in block diagram form in FIG. 3. As shown therein, information and start-up packets transmitted on bus 12 are applied to a receiver 26 whose output is connected to: collision detect circuit 28, jamming signal detector 30; and information packet detector 32. Collision detect circuit 28 detects the presence of a collision of two or more packets on bus 12. While any collision detect circuit 28 may be utilized, one suitable circuit is illustrated in U.S. Pat. No. 4,063,220. Collision detect circuit 28 compares the information contained on bus 12 to the information being transmitted by the BIU 16 of which control circuit 24 forms a part. To this end, collision detect circuit 28 also receives at an input 28a, the signal being transmitted by BIU 16 from the transmission system 22. Whenever collision detect circuit 28 detects a collision on bus 12, it generates a binary "1" at its output. The binary "1" appearing at the output of collision detect circuit 28 is applied to an OR gate 34 whose output is connected to the reset input R of flip-flop 36. This causes the Q and $\overline{Q}$ outputs of flip-flop 36 to jump to the binary "0" and binary "1" levels, respectively. The Q and $\overline{Q}$ outputs of flip-flop 36 are applied to contention system 18 and bidirectional token flow system 20, respectively. As a result, the binary "1" appearing at the output of collision detect circuit 28 will disable contention system 18 and enable bidirectional token flow system 20 so as to convert transmission system 22 to the bidirectional token flow mode of operation.

In order to inform the remaining BIUs 16 of the detected collision, the output of collision detect circuit 28 is applied to jamming signal generator 38 which places a jamming signal (e.g., a high frequency tone) on bus 12 via driver 40. This signal is detected by the jamming signal detectors 30 of the remaining BIUs 16, with the result that these other jamming signal detectors 30 each generate a binary "1" at the associated output. This signal is applied, in each of the other BIUs, to the reset input R of the associated flip-flop 36, via the associated OR gate 34, with the result that the transmission system 22 of each of the remaining BIUs 16 will switch that BIU to the bidirectional token flow mode of operation.

Once transmission system 22 is operating in the bidirectional token flow mode of operation, it will switch back to the contention mode whenever a predetermined time period (e.g., 10 seconds) elapses without the appearance of an information packet on bus 12. To this end, each control circuit 24 includes a timer 42 which is set when transmission system 22 is initially placed in the bidirectional token flow mode of operation and is reset whenever an information packet appears on transmission bus 12. As a result, timer 42 will only time out if an information packet does not appear on transmission bus 12 for the predetermined time interval.

Timer 42 is initially set by the binary "1" appearing at the output of OR gate 34 whenever a collision occurs on bus 12. This signal is applied to the reset R input of timer 42 via an OR gate 44. The remaining input of OR gate 44 is connected to the output of information packet detector 32, which generates a binary "1" on its output each time a new information packet is received by BIU 16. While any implementation of information packet detector 32 may be used, one possible implementation requires that at least one start-up bit be placed in the header of both information and start-up packets. The at least one start-up up bit will indicate whether the transmitted packet is a start-up packet or an information packet. Information packet detector 32 will contain circuitry for examining the header of the receive signal to determine if it is an information packet. If it is, information packet detector 32 will place a binary "1" on its output, which will reset timer 42 each time a new information packet is transmitted on bus 12.

Whenever timer 42 times out, it generates a binary "1" on its output, which is applied to the set input S of flip-flop 36. This causes the Q and $\overline{Q}$ outputs of flip-flop 36 to jump to the binary "1" and "0" levels, respectively, thereby disabling bidirectional token flow system 20 and enabling contention system 18 so as to transfer transmission system 22 to the contention mode of operation.

In the bidirectional token flow system described in co-pending application Ser. No. 351,821, BIUs 16 transmit two types of information packets: a normal packet and a high priority minipacket. The primary difference between the two information packets concerns the amount of information in the packet. A minipacket has relatively few bytes of information while a normal packet has a relatively large number of bytes. Minipackets are used for circuit switching on the bus communication system. In this mode of operation, the message or packet receive time from the terminal is made to appear as short as possible. Typically, the communications between a terminal and the BIUs is very slow in comparison with the transmission speed of the bus. For example, it will take 0.666 seconds for a BIU to receive a 100-character message from a synchronous terminal operating at 1200 baud. The use of circuit switching overcomes this delay problem by forming and transmitting a minipacket as a BIU receives a few bytes of information from a terminal. In some cases, computer-terminal software/hardware protocols are designed for communication over telephone lines which do not have delays such as the one desired above. For example, an IBM 370 computer operating with the BSC protocol will disconnect if it experiences 0.666 seconds packet formation delay. Such user applications are not suitable for system operation in packet switched mode. Moreover such packet formation delays such as the one described above increase end-to-end delay variance. The end-to-end delay variance is the most important system parameter for the transmission of encoded voice in the bus communication systems. For example, a BIU can be configured such that one or more ports are dedicated (e.g. hardwired) to a user terminal which provides data (e.g. encoded voice) requiring circuit switching (e.g. as by the use of minipackets in time division-multiplexing manner); whenever that BIU port receives a previously-assigned (e.g. two) bytes of incoming data in a buffer, a minipacket is formed and transmitted. Hence, the use of circuit switching in such systems overcomes the protocol problems of the computer/terminals designed for use with telephone lines, i.e. communications links having no appreciable delays, and allows low cost encoded voice transmission.

The length of the mini-packets are too short to permit the collision detect circuit 28 to detect a collision of two high priority packets on bus 12. In order to overcome this problem, when transmission system 22 is operating in the contention mode it preferably adds a sufficient number of bits to the mini-packets to enable the collision detect circuit 28 to detect the collision involving one or more mini-packets on the bus.

For clarity of explanation, control circuit 24 has been illustrated as being a separate element of BIU 16. It should be recognized, however, that control circuit 24 may be implemented using at least a portion of the hardware and/or software forming part of the transmission system 22.

The present invention may be embodied in other specific forms without departing from the spirit or essential attributes thereof and, accordingly, reference should be made to the appended claims, rather than to the foregoing specification, as indicating the scope of the invention.

What is claimed is:

1. A bus communication system comprising a plurality of bus interface units (BIUs), each connected to a transmission bus having a straight-line topology at respective spaced locations along said bus, each respective BIU including:
   (A) transmission means for transmitting information packets on said bus, said transmission means being operable in:
       (1) a contention mode wherein said transmission means completes the transmission of an information packet only after that respective BIU senses said bus and determines that no additional information packets are also being simultaneously transmitted on said bus; and
       (2) a token passing mode wherein said transmission means transmits and information packet only after the expiration of a time interval unique to that respective BIU and determined by the relative location of that respective BIU and the last BIU to transmit one of an information and a start-up packet on said bus; and
   (b) control means for causing said transmission means to switch between said contention and token passing modes of operation as a function of the transmission activity on said bus.

2. The bus communication system of claim 1, wherein said control means includes means for causing said transmission means to switch from said contention mode to said token passing mode responsive to detection of a collision of at least two information packets which has occurred on said bus.

3. The bus communication system of claim 2, wherein said control means further includes means for detecting a collision between an information packet being transmitted by its respective BIU and another information packet being transmitted on said bus.

4. The bus communication system of claim 3, wherein said control means further includes means for transmitting a jamming signal on said bus when said detecting means of that respective BIU detects a collision between said information packet being transmitted by its respective BIU and another information packet being transmitted on said bus.

5. The bus communication system of claim 4, wherein said control means further includes first means for causing said transmission means to switch from said contention mode of operation to said token passing mode of operation whenever one of (a) said detecting means detects a collision between an information packet being transmitted by its respective BIU and at least another information packet on said bus and (b) said control means detects the presence of said jamming signal on said bus.

6. The bus communication system of claim 5, wherein said control means includes means for switching said transmission means from said token passing mode of operation to said contention mode of operation whenever no information packets are transmitted on said bus for a predetermined time period.

7. The bus communication system of claim 6, wherein said switching means includes: a timer for timing out said predetermined time period; means for setting said timer whenever said control means first causes said transmission means to switch to said token passing mode of operation; and means for resetting said timer each time that respective BIU receives a new information packet from said bus.

8. The bus communication system of claim 3, wherein said control means includes means for switching said transmission means from said token passing mode of operation to said contention mode of operation whenever no information packets are transmitted on said bus for a predetermined time period.

9. The bus communication system of claim 8, wherein said switching means includes: a timer for timing out said predetermined time period; means for setting said timer whenever said control means first causes said transmission means to switch to said token passing mode of operation; and means for resetting said timer each time that respective BIU receives a new information packet from said bus.

10. The bus communication system of claim 2, wherein said control means includes means for switching said transmission means from said token passing mode of operation to said contention mode of operation whenever no information packets are transmitted on said bus for a predetermined time period.

11. The bus communication system of claim 10, wherein said switching means includes: a timer for timing out said predetermined time period; means for setting said timer whenever said control means first causes said transmission means to switch to said token passing mode of operation; and means for resetting said timer each time said respective BIU receives a new information packet from said bus.

12. The bus communication system of claim 2, wherein said information packets include normal packets having m bytes of information and mini-packets having n<m bytes of information, the length of said mini-packets being too short to permit said control means to detect a collision involving at least one mini-packet on said bus and wherein said transmission means adds a sufficient number of bytes to said mini-packets to enable said control means to detect a collision involving at least one mini-packet on said bus before said transmission means transmits said mini-packets on said contention mode.

13. The bus communication system of claim 12, wherein encoded voice data is transmitted by said mini-packets.

14. The bus communication system of claim 1, wherein said control means causes said transmission means to switch from said token passing mode of operation to said contention mode of operation, whenever no information packets are transmitted on said bus for a predetermined time period.

15. The bus communication system of claim 14, wherein said control means includes a timer for timing out said predetermined time period, means for setting said timer whenever said control means first causes said transmission means to switch to said token passing mode of operation and means for resetting said timer each time said respective BIU receives a new information packet from said bus.

* * * * *